F. W. MEEGAN.
SEAL LOCK.
APPLICATION FILED MAR. 24, 1917.
1,317,805.
Patented Oct. 7, 1919.
2 SHEETS—SHEET 1.
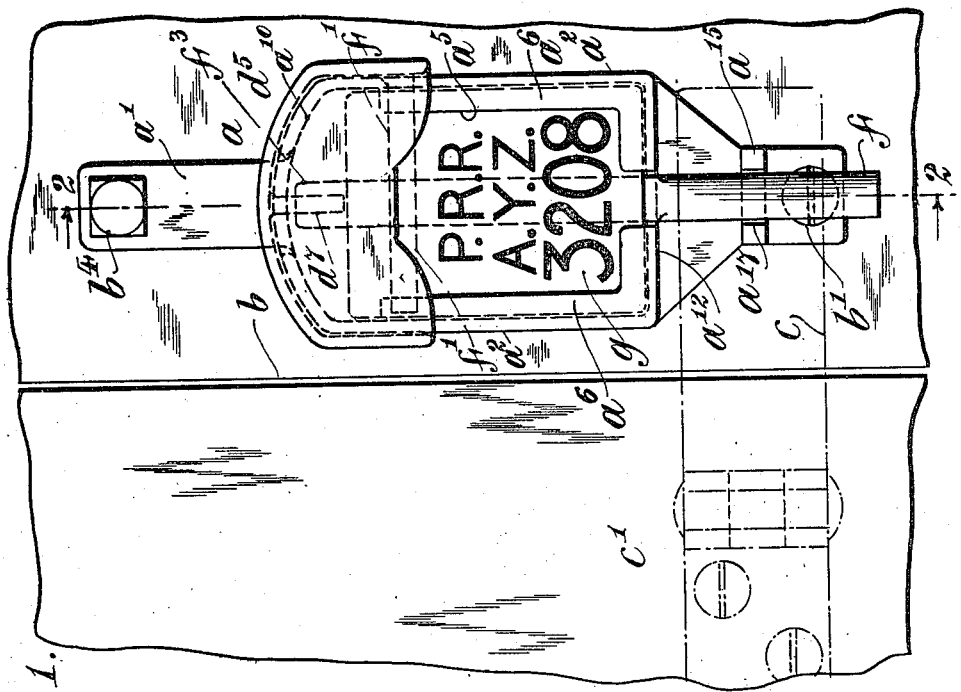
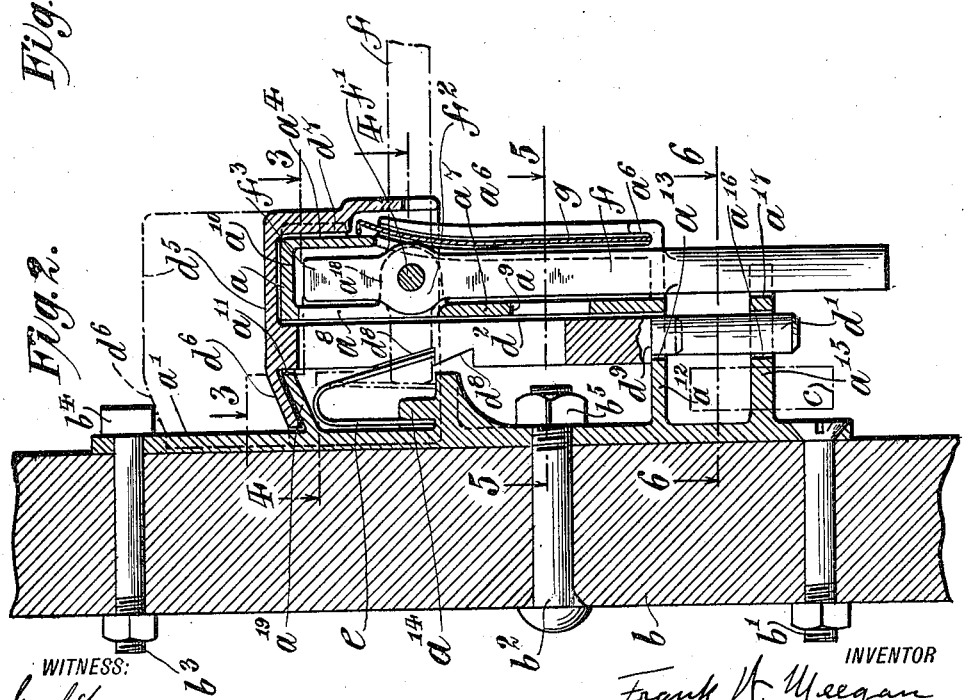

F. W. MEEGAN.
SEAL LOCK.
APPLICATION FILED MAR. 24, 1917.
1,317,805.
Patented Oct. 7, 1919.
2 SHEETS—SHEET 2.
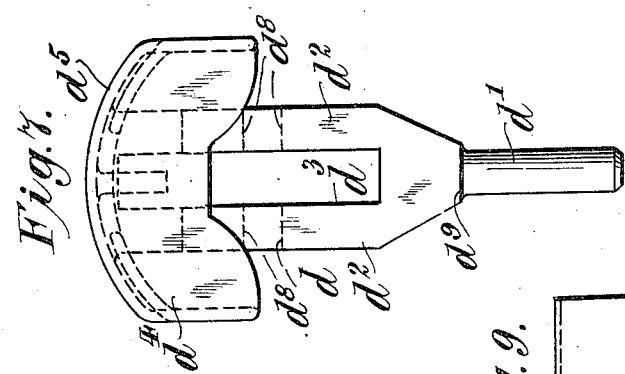
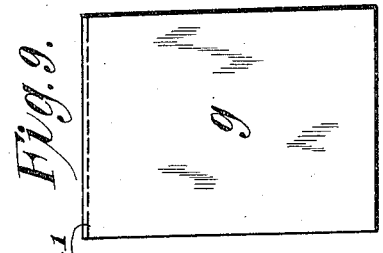
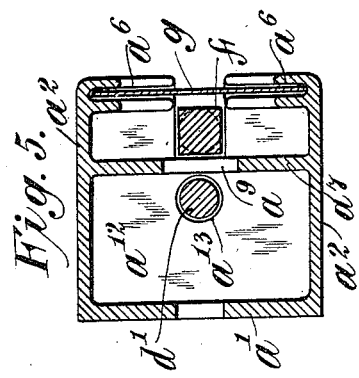
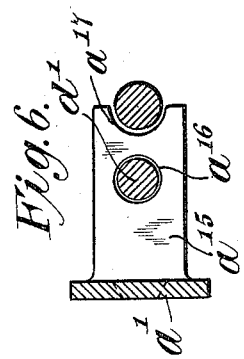
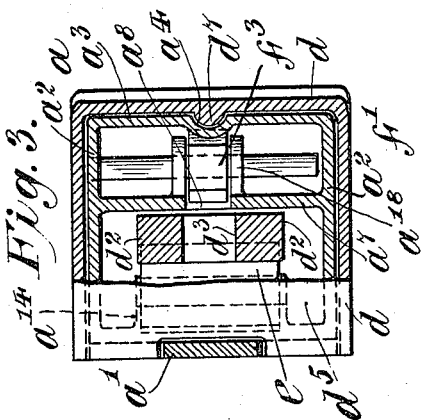
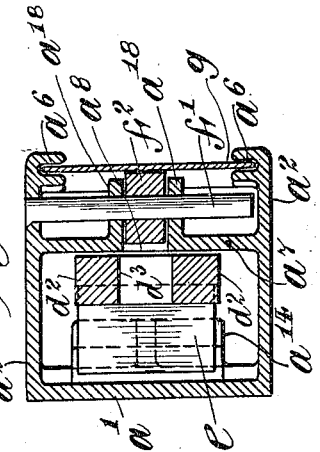
WITNESS:
Geo Schwarz
INVENTOR
Frank W. Meegan
BY
Redding, Greeley & Goodlett
ATTORNEYS

UNITED STATES PATENT OFFICE.

FRANK W. MEEGAN, OF NEW YORK, N. Y.

SEAL-LOCK.

1,317,805. Specification of Letters Patent. Patented Oct. 7, 1919.

Application filed March 24, 1917. Serial No. 157,153.

*To all whom it may concern:*

Be it known that I, FRANK W. MEEGAN, a citizen of the United States, and residing in the borough of Manhattan of the city of New York, county of New York, in the State of New York, have invented certain new and useful Improvements in Seal-Locks, of which the following is a specification, reference being had to the accompanying drawings, forming a part hereof.

This invention has relation to fastenings for doors, boxes, drawers, bags, etc., in the use of which reliance is placed rather upon sealing devices than upon locks and keys to prevent improper manipulation of the fastenings. Fastenings of this character, which may be called seal-locks, are commonly employed, for example, for securing the doors of freight cars while in transit, the fastening device itself being sufficiently strong to secure the door against accidental opening, while its own release is prevented by a wire seal which might easily be ruptured although this condition would immediately disclose the fact that the fastening had been tampered with. Fastenings of this character are sometimes used for other receptacles, such as bags, baskets and boxes, while in transit or in storage. Freight cars and receptacles of the character referred to might be broken into or broken open and the purpose of the fastening devices is therefore to prevent accidental opening and to prevent deliberate opening without disclosing immediately the fact of opening.

The present invention has for its object to provide an improved fastening of the general character referred to which cannot be tampered with so as to permit opening without destruction of the seal, will make it possible to use seals which can be placed without the use of any tool or appliance and will also make easy the keeping of a record to show when and by what authorized person the fastening is disengaged. In the improved fastening the movement of a suitable handle or operating member to release the bolt or other specific fastening, is made to rupture a seal which is easily placed in position but cannot be removed without effective movement of the operating handle or releasing device. The invention is illustrated herein as embodied in a seal-lock adapted for use on a freight car door, but it will be understood that it is capable of application to many other specific uses.

In the drawings,—

Figure 1 is a view in front elevation showing the improved seal-lock applied to the door of a freight car, a portion of the door and of the adjacent wall of the car being shown.

Fig. 2 is a view in vertical section on the plane indicated by the broken line 2—2 of Fig. 1.

Figs. 3, 4, 5 and 6 are detail views in section respectively on the planes of section indicated by the broken lines 3—3, 4—4, 5—5 and 6—6 of Fig. 2.

Fig. 7 is a detail view in elevation of the bolt removed from the frame.

Figs. 8 and 9 are respectively an edge view and a front view of the seal shown in Fig. 1.

The seal-lock illustrated in the drawings as an embodiment of the invention comprises a frame, a bolt, a detent, and a bolt-releasing lever or handle. The frame $a$ is adapted to be secured to the wall $b$ of a freight car and to support the other parts of the fastening as well as the seal. It is conveniently secured to the car wall $b$ by three bolts $b'$, $b^2$ and $b^3$. The head $b^4$ of the uppermost bolt $b^3$, projecting beyond the front surface of the base $a'$, forms a stop to limit the upward movement of the bolt hereinafter referred to. The bolt $b^2$, inserted from the inner side of the car wall, receives its nut $b^5$ through the frame and the nut is covered by the bolt so that it becomes impossible to remove the fastening from the wall when the parts have been assembled, as will be hereinafter explained. Integral with the base-plate $a'$ is a box-like casing comprising imperforate side walls $a^2$; a front wall $a^3$ with a vertical groove $a^4$ in its upper portion, and in its lower portion a large opening $a^5$, with flanged seal-retaining grooves $a^6$ at its sides and bottom; a partition wall $a^7$, with a slotted opening $a^8$ in its upper portion, and an opening $a^9$ in its lower portion, in line with the bolt $b^2$; a top-plate $a^{10}$ with a bolt-guiding opening $a^{11}$; and a bottom plate $a^{12}$ with a bolt-guiding opening $a^{13}$. The top-plate $a^{10}$ is preferably rounded, as shown by dotted lines in Fig. 1, and the portion $a^{19}$ near the base-plate $a'$, dips toward the base-plate, all for the purpose of preventing, in coöperation with the hood carried by the bolt, as hereinafter described, the ingress of water, even if the fastening be exposed to a driving rain. Within the casing, preferably integral with the base-plate, is a retainer $a^{14}$ for the detent hereinafter referred to. Below the casing and integral with the base-plate $a'$ is a projecting plate $a^{15}$ adapted to receive the usual hasp $c$, secured to the car door $c'$, as indicated by dotted lines in Figs. 1 and 2, the plate having an opening $a^{16}$ to receive the lower end of the bolt hereinafter referred to, and having also a notch $a^{17}$ to receive the lower end of the releasing lever or operating handle.

The bolt $d$ is preferably formed as shown in Fig. 7, having a cylindrical lower portion $d'$ to enter the projecting plate $a^{15}$ outside of the hasp $c$ and thereby retain the same in position; a forked or slotted upper portion $d^2$, the two legs of which are separated by a vertical, central slot $d^3$; and a hood $d^4$ with a curved top $d^5$, dipped rearwardly as shown at $d^6$ in Fig. 2, depending sides, and an internal rib $d^7$ to register with the groove $a^4$ in the casing. The two legs $d^2$ are notched as shown at $d^8$, for coöperation with the detent which, as shown in Figs. 2, 3 and 4, may consist of a broad spring-plate $e$, bent in U-shape, as shown in Fig. 2, and dropped into the retainer $a^{14}$, through the opening $a^{11}$ in the top of the casing, before the casing and bolt are assembled, the upper end of the detent standing closely under the portion $a^{19}$ of the top of the casing, so that the detent cannot be lifted. The detent is wide enough to engage both of the notched legs $d^2$ of the bolt, which cannot be raised until the engaging member of the detent is thrust rearwardly, into the position shown by dotted lines in Fig. 2, so as to clear the notched portions of the bolt. The bolt has an offset portion $d^9$, just above the cylindrical portion $d'$, so as to prevent the introduction of any instrument through the hole $a^{13}$ in the bottom plate $a^{12}$ for the purpose of tampering with the detent.

The bolt-releasing device or operating handle is arranged to coöperate directly with the detent $e$ and disengage it from the bolt. It preferably comprises a lever $f$ which is pivoted in the casing upon the pin $f'$ which is supported in ears $a^{18}$ on the partition plate $a^7$. It is inserted through an opening formed in one of the side walls $a^2$ of the casing and may be secured in place by any convenient means. Its outer end is covered by one of the side walls of the hood $d^4$ and it is therefore inaccessible when the bolt is down. The hub $f^2$ of the lever is enlarged slightly so as to make it impossible to introduce even a thin instrument, when the lever is thrown to a horizontal position, as shown by dotted lines in Fig. 2, for the purpose of holding back the engaging member of the detent. When the bolt is down and the seal is in place the narrow crevices at the sides of the hub of the lever are inaccessible. The upper part $f^3$ of the releasing lever is arranged to pass through the opening $a^8$ of the partition wall $a^7$, and through the slot $d^3$ of the bolt, when the lever is swung to a horizontal position, as shown in Fig. 2, against the engaging member of the detent $e$ and to push it out of engagement with the bolt, which can then be raised.

The seal $g$ is a thin, flat plate of any suitable material, such as cardboard or frangible metal, which can be slipped into the flanged grooves $a^6$ which constitute the seal holder and are inclined outwardly at the top, as clearly shown in Fig. 2. The outer surface of the seal, exposed between the flanges of the holder, may receive identifying letters and a serial number, and if formed of metal its upper edge may be turned over as at $g'$.

In assembling and using the improved seal-lock, the base-plate $a'$ is first secured to the wall by the bolts $b'$ and $b^2$, the nut $b^5$ of the latter being placed and turned home through the opening $a^9$ in the partition wall $a^7$ of the casing. Then the detent $e$ is forced into place through the opening $a^{11}$ in the top of the casing. Then the locking bolt $d$ is dropped into place and is pushed down far enough to permit the bolt $b^3$ to be put into place, its head $b^4$, as already explained, then constituting a stop to limit the upward movement of the locking bolt $d$, through contact with the top $d^5$ of the hood. If the bolt is dropped down far enough to permit the detent to engage the notches therein, the operating handle or releasing device $f$ is swung to a horizontal position so as to disengage the detent from the locking bolt, and the locking bolt is then raised to the position shown by dotted lines in Fig. 2 and the operating handle is permitted to return to its vertical position. Then the seal $g$ is dropped into the holder prepared to receive it and the hasp $c$ having been swung over the projecting plate $a^{15}$, the locking bolt is permitted to drop or is pushed down to its lowest position shown in full lines in Fig. 2, its upward movement being then prevented by engagement of the detent with the notches. The fastening device is now locked and under seal. It is impossible to raise the locking bolt without operation of the releasing lever $f$ and any effective movement of that lever will rupture the seal $g$. In practice the seals will be supplied only to train conductors or other proper custodians and records will be kept of the serial numbers of the seals delivered to each such conductor or custodian, so that it can always be determined in whose custody or care the car or other receptacle was when the seal was broken and if the car or other receptacle is opened by any authorized person and resealed, it can be determined from the records by whom it was so opened and resealed. It is possible of course, to smash the fastening at any time, but it is so constructed, as already explained, that it can neither be removed nor tampered with, even through collusion of different persons, when it has once been sealed, so that the locking bolt cannot be withdrawn without rupture of the seal. The skirt of the hood $d^4$, carried by the locking bolt, is extended downwardly far enough, as will be observed, to lap the top of the casing, even when the bolt is in its highest position, so that it is impossible to introduce through the top of the casing any instrument for the purpose of tampering with the detent.

It will be understood that details of construction and arrangement of the improved seal-lock will be varied to suit different conditions of use and that the invention is not limited to the construction and arrangement of parts shown and described herein.

I claim as my invention:

1. A seal-lock comprising a frame having a base-plate and a casing, and a sliding locking bolt having at one end a hood to cover the corresponding end of the casing, the upper and lower end plates of the casing having openings to receive and guide the bolt, and a bolt having an offset to overlap the edge of the opening through one of said plates.

2. A seal-lock comprising a frame having a base-plate and a casing, a sliding locking bolt, a detent for the bolt within the casing, and bolt-releasing means mounted in the casing, the outer wall of the casing having an opening to permit movement of the bolt-releasing means, and having grooves at the sides of said opening to receive a flat seal, outside of said opening, and the locking bolt having a hood to cover the open ends of the grooves.

3. A seal-lock comprising a frame having a base-plate and a casing, a sliding, longitudinally slotted bolt having the portions at opposite sides of the slot notched on their rear faces, a detent mounted in the casing and normally engaging the notches of the bolt, and a releasing lever pivotally mounted in the casing and having one end adapted to swing through the slot of the bolt to engage the detent and disengage it from the bolt.

This specification signed this 22 day of March A. D. 1917.

FRANK W. MEEGAN.

Copies of this patent may be obtained for five cents each, by addressing the "Commissioner of Patents, Washington, D. C."